United States Patent
Vössing et al.

(10) Patent No.: US 8,808,451 B2
(45) Date of Patent: Aug. 19, 2014

(54) REDUCING AGENT FOR THE SOLUBLE CHROMATE CONTENT OF CEMENT AND METHODS FOR PRODUCTION THEREOF

(75) Inventors: Michael Vössing, Bochum (DE); Auer Gerhard, Krefeld (DE); Benno Laubach, Krefeld (DE); Detlef Klein, Krefeld (DE); Werner Schuy, Tönisvorst (DE); Klaus Köllisch, Krefeld (DE); Erwin Weiss, Kriftel (DE); Werner Bahl, Recklinghausen (DE); Philip Reese, Nelson (NZ)

(73) Assignee: Crenox GmbH, Krefeld (DE)

( * ) Notice: Subject to any disclaimer, the term of this patent is extended or adjusted under 35 U.S.C. 154(b) by 0 days.

(21) Appl. No.: 13/371,783

(22) Filed: Feb. 13, 2012

(65) Prior Publication Data
US 2012/0137934 A1 Jun. 7, 2012

Related U.S. Application Data

(63) Continuation of application No. 10/564,651, filed as application No. PCT/EP2004/007940 on Jul. 16, 2004, now abandoned.

(30) Foreign Application Priority Data

Jul. 17, 2003 (DE) .................................. 103 32 530

(51) Int. Cl.
*C04B 22/08* (2006.01)
*C04B 14/00* (2006.01)

(52) U.S. Cl.
USPC .......................................... 106/815; 106/819

(58) Field of Classification Search
USPC ................................................... 106/815, 819
See application file for complete search history.

(56) References Cited

U.S. PATENT DOCUMENTS

| 4,505,886 A | * | 3/1985 | Cody et al. ..................... 423/616 |
| 5,362,321 A | * | 11/1994 | Larsen ........................... 106/713 |
| 2008/0282939 A1 | | 11/2008 | Kehrmann |

FOREIGN PATENT DOCUMENTS

| WO | WO 98/54095 A1 | 12/1998 |
| WO | WO 2005/009917 A1 | 2/2005 |

* cited by examiner

*Primary Examiner* — Rebecca Lee
(74) *Attorney, Agent, or Firm* — Timothy J. Monahan; Monahan & Company, LLC

(57) ABSTRACT

The invention relates to a reducing agent for the soluble chromate content of cement and to methods for the production thereof, which comprise concentrating an used sulfuric acid, containing iron (II) sulfate, and separating the sulfuric acid from the obtained precipitate which contains iron (II) sulfate.

14 Claims, No Drawings

REDUCING AGENT FOR THE SOLUBLE CHROMATE CONTENT OF CEMENT AND METHODS FOR PRODUCTION THEREOF

This application is a continuation of Ser. No. 10/564,651, filed Jan. 13, 2006, which is a National Phase application based on PCT/EP2004/007940, filed Jul. 16, 2004.

The invention relates to a reducing agent for the soluble chromate content in cement and to methods for producing the same.

The chromium content of cements is normally between 20 ppm and 100 ppm depending on the raw material basis used. The chromium contained in cement can dissolve when mixed with water as chromium (VI) and, if there is frequent contact, can sensitise the skin and cause a chromium allergy, so-called contact dermatitis from which bricklayers suffer. In order to protect against the chromium allergy, it is taken into consideration to chemically reduce the chromium (VI) to chromium (III) and to thus dramatically reduce solubility. Iron (II) sulphate (as a heptahydrate or monohydrate) is principally used as the reducing agent in the cement industry in order to achieve a chromium (VI) content of less than 2 ppm (cf. Locher, Friedrich Wilhelm: *Zement: Grundlagen der Herstellung and Verwendung* [Cement: Basics of Production and Use], Verlag Bau+Technik GmbH, Düsseldorf 2000).

An overview can be found in W. Manns, C. Laskowski: *Beton* [concrete] February 1999, 78 to 85.

The addition of iron sulphate to ground cement is described in EP 54314, 160746 and 160747 A1, wherein the iron sulphate is added in dry form prior to the cement storage silo. According to EP 160 747 A1, the iron sulphate is provided with a coating in order to increase resistance to oxidation.

Iron (II) sulphate predominantly comes from the process for manufacturing titanium dioxide using the sulphate method, where it accumulates as a by-product. Iron (II) sulphate can thereby be obtained by crystallisation out of the titanium and iron-containing sulphuric acid solution, which is obtained when digesting the titanium and iron-containing ore or synthetic raw materials (black liquor). Part, however not all, of the iron is hereby removed from the solution. Crystallisation of the iron (II) sulphate thereby occurs by cooling the hot solution, e.g. by means of vacuum cooling, and, optionally, additional concentration by evaporation.

Following separation of the iron (II) sulphate, the remaining solution is hydrolysed. The titanium oxide hydrate hereby obtained is separated from the residual so-called dilute acid by means of filtration. Whilst the titanium oxide hydrate is further processed into titanium dioxide, the dilute acid must be made available for further use or converted into harmless compounds in a suitable manner.

Iron (II) sulphate heptahydrate can also be obtained from the dilute acid by means of crystallisation in a manner similar to that described above for the obtainment of iron (II) sulphate heptahydrate from the so-called black liquor. The possibility of separating iron (II) sulphate heptahydrate from the dilute acid before concentration is described in EP 132820. However, it is cited therein as a disadvantage that in the case of such a separation of iron (II) sulphate heptahydrate, the other metal sulphates remain in the dilute acid and that there are no sufficient possibilities for using the green salt.

EP 132820 therefore suggests concentrating the dilute acid by evaporation, optionally separating metal sulphates and reacting the remaining metal sulphates with CaO, Ca(OH)$_2$ and/or CaCO$_3$ to form gypsum and poorly soluble metal compounds. The solids obtained in this manner are light brown in colour, which is due to the oxidation of iron (II) hydroxide to iron (III) hydroxide. The use of this mixture of solids as an iron-containing additive when calcining cement is, inter alia, described.

EP 160 747 A1 describes that the chromate-reducing effect of iron (II) sulphate mixed into the cement decreases over time during storage. The amount of iron (II) sulphate to be added therefore has to be determined depending on the storage time in order to ensure that the chromate in the cement preparation is completely reduced at a specific point in time.

The Danish cement industry therefore only guarantees compliance with the limiting value of 2 ppm of soluble chromium for 2 months (cf. Report by the *Verein deutscher Zementwerke e.V. (VDZ) Forschungsinstitut der Zementindustrie* [Association of German Cement Works (VDZ) Research Institute of the Cement Industry] "*Chromatarmer Zement für einen verbesserten Arbeitsschutz*" [Low-Chromium Cement for Improved Occupational Safety] from Jan. 16, 2002). The working group "Analytical Chemistry" of the VDZ specified an unproblematic storage period of 3 to 6 months. Stability over a long period is, however, thereby highly dependant on the storage conditions of the cement, e.g. moisture and temperature (cf. Progress report regarding the significance of chromate in cements and cement-containing preparations, dated Jan. 5, 1999; *Verein deutscher Zementwerke e.V. (VDZ) Forschungsinstitut der Zementindustrie*).

The object of the invention is to provide an iron (II) sulphate-containing reducing agent for the soluble chromate content in cement as well as suitable methods for producing the same.

This object is solved according to the invention by means of a method for producing an iron (II) sulphate-containing reducing agent, which includes concentrating an iron (II) sulphate-containing used sulphuric acid and separating the sulphuric acid from the iron (II) sulphate-containing precipitate obtained. An effective reducing agent for chromate in cement is obtained in this manner. Following separation of the sulphuric acid from the obtained iron (II) sulphate-containing precipitate, subsequent reduction of the amount of sulphuric acid adhering to the separated precipitate preferably takes place by means of further separation, partial neutralisation or neutralisation of this sulphuric acid. It was surprisingly found that owing in particular to the reduction of the amount of sulphuric acid adhering to the separated precipitate by means of further separation, partial neutralisation or neutralisation, it was possible to obtain a suitable reducing agent for the soluble chromate content in cement, which can be used both with and without further additives as a reducing agent for chromate in cement.

An iron (II)-containing used sulphuric acid accumulates in various different industrial processes. For example, an approximately 25% aqueous sulphuric acid (dilute acid) is formed as a by-product when producing titanium dioxide according to the sulphate process. The iron (II) sulphate-containing reducing agents according to the invention can be obtained from this dilute acid following concentration, precipitation of iron (II) sulphate-containing salt mixtures and separation of the sulphuric acid from the obtained precipitate. A subsequent reduction of the amount of sulphuric acid adhering to the separated precipitate preferably occurs therein following separation of the sulphuric acid from the obtained precipitate.

However, other iron (II) sulphate-containing used sulphuric acids besides the dilute acid from the production of titanium dioxide can also be used. For example, iron (II) sulphate-containing used sulphuric acids from metal pickling plants are suitable herefor.

It is also possible to use mixtures of iron (II) sulphate-containing used sulphuric acids. Finally, it is furthermore possible to use iron (III) sulphate-containing used sulphuric acids provided that they are reduced beforehand with metallic iron or other reducing agents.

The used sulphuric acids employed preferably have a titanium content of less than 1.5% by weight, particularly preferred less than 0.8% by weight.

According to the invention, the iron (II)-containing used sulphuric acid is concentrated to a sulphuric acid content of more that 50%, preferably 60 to 80%, with the salts dissolved therein—predominantly iron (II) sulphate monohydrate—crystallising out to a large extent as a fine-crystalline precipitate. Concentration can occur either continuously or non-continuously in evaporation systems by evaporating or vaporising the water at normal pressure or under vacuum. Continuously operated forced-circulation evaporation systems under vacuum are preferably used. The subsequent crystallisation can take place in evaporating systems with subsequent salt ripening (cooling). The present metal sulphates can thereby crystallise out as sulphates, hydrogen sulphates, oxysulphates or as complex mixtures hereof. The iron thereby preferably crystallises as iron (II) sulphate monohydrate. Following separation of the precipitate, e.g. by means of filtration, sedimentation or centrifuging, the remaining pre-concentrated sulphuric acid is either concentrated further and returned to the process or is used in another manner. The separated precipitate (also called a filter salt if the used sulphuric acid is obtained from titanium dioxide production) is preferably separated in the warm (at approximately 70° C.) on filter aggregates such as, for example, chamber filter presses, press belt filters, rotary filters, candle pressure filters. It is particularly preferred for separation to occur by means of filtration, for example using candle pressure filters or chamber filter presses.

The separated precipitate (e.g. filter salt) preferably contains between 40 and 60% iron (II) sulphate monohydrate, between 3% and 10% further metal sulphates, between 15% and 30% free sulphuric acid and approximately 10% to 13% water.

Following separation, the amount of sulphuric acid adhering to the separated precipitate is preferably further reduced, for example by displacing the sulphuric acid using compressed air or washing with steam, by washing with a washing medium such as dilute acid, saturated $FeSO_4$ solution, diluted $FeSO_4$-containing aqueous solutions or water, by reaction with iron or an alkaline iron (II) compound and water, or by adding powdered alkali compounds, in particular $CaCO_3$, $CaO$, $Ca(OH)_2$, $MgO$ and/or $Mg(OH)_2$ or elutriations thereof, such as lime water.

Washing of the separated precipitate with a washing medium is preferably carried out with 40 to 500% by weight of washing medium based on the separated precipitate (e.g. filter salt).

Washing is preferably carried out at a temperature of 55 to 100° C. Particularly preferred are temperatures between 55 and 75° C.

Dilute acid has proven to be an ideal washing medium, particularly if washing is carried out at an elevated temperature. When washing the separated precipitate with dilute acid in this temperature range, little salt is dissolved out of the separated precipitate since dilute acid already contains the salts in dissolved form and the solubility of iron (II) sulphate in this medium has a negative temperature coefficient (i.e. solubility decreases as the temperature increases), a stable, free-flowing precipitate is obtained, which does not display any thixotropic properties.

Washing with warm dilute acid can be carried out in the same filtration apparatus without having to remove the precipitate (filter cake) in the meantime. The filtration process preferably comprises the following steps in the given order: loading of the filtering apparatus, pressing out, optionally blowing through or out, washing with dilute acid, blowing through or out and discarding. The separated precipitate can also be suspended in warm dilute acid in a receiver and filtered off again.

Washing with dilute acid is then particularly advantageous if the separated precipitate is filter salt from titanium dioxide production since no additional washing liquid is created, which would either burden the recycling system by increasing the amount of water to be evaporated or would have to be otherwise disposed of;

a sufficient amount of hot dilute acid is available in the process for washing the filter salt;

washing can take place in the same apparatus as those in which separation of the filter salt from the pre-concentrated sulphuric acid is also carried out. No additional apparatus are thus necessary;

cross-contamination of the washing medium (dilute acid) and the mother liquor (pre-concentrated acid) of the filter salt separation is technically inconceivable;

the dilute acid reaching concentration by evaporation is enhanced by washing and thus more acid is concentrated during reprocessing of the dilute acid when the same amount of water is evaporated and the corresponding amount of specifically required energy is saved;

the systems used when further reprocessing the separated sulphuric acid (for example filter salt cracking systems, sulphuric acid contact systems and/or sulphur trioxide absorption systems) are relieved of the proportion of sulphuric acid washed out of the filter salt and thus a higher amount of filter salt can crack;

and the sulphuric acid adhering to the filter salt can be fed back to the production cycle.

Water, a saturated $FeSO_4$ solution or diluted $FeSO_4$-containing aqueous solutions can also be used in addition to dilute acid as washing mediums for reducing the amount of sulphuric acid adhering to the separated precipitate.

According to the invention, reduction of the amount of sulphuric acid adhering to the separated precipitate following concentration of the used sulphuric acid and separation of the precipitate from the concentrated used sulphuric acid can also occur by means of washing with steam, preferably at a temperature of greater than 100° C. It is thereby to be noted that any additionally used liquid or condensate must later be removed again, using energy, from the accumulating acid by means of distillation.

Washing with steam has the advantage that only very little water in the form of steam is used since the acid is firstly diluted by the steam, which simultaneously blows off the adhering acid. At the elevated temperatures used according to the invention, no further condensation of steam occurs following the separation of the sulphuric acid from the separated precipitate carried out in this manner. Use is therefore made of the hygroscopic properties of the sulphuric acid; steam is namely only condensed in the separated precipitate for as long as highly concentrated sulphuric acid is still present. On the other hand, iron (II) sulphate monohydrate is poorly soluble in diluted sulphuric acid at an elevated temperature and is furthermore blown out in situ such that a solution equilibrium cannot be achieved. Therefore, only a small proportion of the iron sulphate contained in the separated precipitate is washed out by means of washing with steam.

The following advantages generally arise for washing the separated precipitate with steam:

- Only a very small amount of water is introduced into the system.
- The washed out sulphuric acid accumulates at a high concentration.
- Only very little iron (II) sulphate monohydrate is dissolved out of the separated precipitate since steam does not have a solvent effect.

Washing with steam is then particularly advantageous for the technical application if the separated precipitate is filter salt from titanium dioxide production since

- the dilute acid reaching concentration by evaporation can be enhanced with the washing acid and therefore specifically less water has to be vaporised when reprocessing the dilute acid and the corresponding amount of energy is saved;
- the filter salt cracking system, the sulphuric acid contact system and the sulphur trioxide absorption system are relieved of the proportion washed out of the filter salt and are thus available for an additional production capacity of sulphuric acid;
- most of the sulphuric acid contained in the filter salt is fed back into the circulation system.

In order to achieve high concentrations of sulphuric acid and low concentrations of iron sulphate in the washing condensate, high steam temperatures are advantageous, however these place greater material requirements on the apparatus used. In order to achieve low concentrations of sulphuric acid in the remaining filter salt cake, low steam temperatures are advantageous.

It is particularly preferred for washing with steam to be carried out at a temperature of 105 to 130° C.

According to the invention, reduction of the amount of sulphuric acid adhering to the separated precipitate following concentration of the used sulphuric acid and separation of the precipitate from the concentrated used sulphuric acid can also occur by reaction with water and metallic iron or an alkaline iron (II) compound above 60° C.

Owing to the high sulphuric acid concentration in the separated precipitate and the metal sulphates dissolved in the adhering acid, which can build sulphuric acid into the crystal lattice, the separated precipitate does not react with metallic iron and only very slightly with alkaline iron (II) compounds. Therefore, the proportion of sulphuric acid in the adhering acid can technically only be partially neutralised or neutralised with difficulty by means of a direct reaction with iron or the alkaline iron (II) compound. When water is added, iron (II) sulphate monohydrate is converted, at a normal ambient temperature, into iron (II) sulphate heptahydrate. In order to dilute the sulphuric acid to such an extent that a reaction with iron or the alkaline iron (II) compound takes place, enough water would therefore have to be added such that beyond the formation of the heptahydrate, an aqueous phase is always present during the reaction with iron or the alkaline iron (II) compound. If the reaction is carried out at colder temperatures, the excess water would then have to be removed in a subsequent method step, e.g. by means of drying.

At temperatures above approximately 60° C., iron (II) sulphate heptahydrate cleaves water to form iron (II) sulphate monohydrate. If the separated precipitate is used above this temperature with little water, the monohydrate is maintained. A free-flowing paste is obtained, in which sulphuric acid is diluted to such an extent that a reaction with iron or the alkaline iron (II) compound, forming additional iron (II) sulphate monohydrate, is possible.

It is preferred for the reaction between the separated precipitate and metallic iron or the alkaline iron (II) compound to take place at a temperature of 60 to 110° C., particularly preferred at a temperature of 75 to 85° C.

When cooling the paste-like yet pumpable and stirable mixture that was reacted out, the remaining water is completely bound forming iron (II) sulphate heptahydrate, and a dry, hard solid is formed.

The separated precipitate is preferably reacted with 80 to 98 mol-% of metallic iron or alkaline iron (II) compound, such as iron (II) carbonate or iron (II) hydroxide or iron (II) oxide, based on the amount of sulphuric acid adhering to the separated precipitate (e.g. filter salt), with as much water being added so that the molar ratio of water to iron sulphate is 6.5 to 7.

When reacting the separated precipitate with an alkaline iron (II) compound, this compound can also be reacted in the form of a natural ore such as siderite. However, iron (II) compounds, which are the component of an industrial by-product, can also be used for this purpose.

If metallic iron is used in the reaction with the separated precipitate, metallic iron having an average particle size of 5 mm or less is preferably used, particularly preferred iron (powder) having an average particle size of 100 µm or less.

The start of the reaction can be accelerated by heating, for example with (direct) steam. The reaction itself is exothermic. The reaction takes longer if coarse iron is used. In this case, water loss as a result of evaporation and heat loss must, where necessary, be compensated by supplying steam. The reaction with siderite is slower and without apparent reaction heat. Heat and water losses must also be compensated here by supplying heat, for example, by direct steam.

Regulation of the steam and/or water supply can be controlled by means of the temperature and/or viscosity (for example by measuring the current consumption of the stirring device). Depending on the particle size of the iron or siderite used, the reaction time can range from a few minutes (use of iron powder: 10 µm) to several hours (use of iron granules: 3 mm, or siderite fraction: <1 mm).

The reaction is generally carried out at normal pressure.

The reaction of the separated precipitate with water and metallic iron or an alkaline iron (II) compound and water can technically take place in a mixing vessel into which the components of the separated precipitate, iron or alkaline iron (II) compound and water are continuously or non-continuously introduced. A paste-like mass results, which can be placed, for example, on a cooling section as pellets for solidification. Another possibility is blowing with cold air. Depending on the reactivity of the neutralising agent, a kneader (double-arm kneader or the like) can also be used for the reaction and solidification.

If the reaction between the separated precipitate and the metallic iron or an alkaline iron (II) compound takes place continuously, the non-reacted proportion of iron or alkaline iron compound can be removed from the overflow and returned. If metallic iron is hereby used for the reaction, the iron can be removed by means of a magnetic separator.

According to the invention, reduction of the amount of sulphuric acid adhering to the separated precipitate following concentration of the used sulphuric acid and separation of the precipitate from the concentrated used sulphuric acid can also occur by displacing the sulphuric acid with compressed air.

According to the invention, partial neutralisation or neutralisation by adding powdered alkali compounds, in particular $CaCO_3$, $CaO$, $Ca(OH)_2$, $MgO$ and/or $Mg(OH)_2$ or elutriations thereof, such as lime water, can also occur in order to reduce the amount of sulphuric acid adhering to the separated precipitate following concentration of the used sulphuric acid and separation of the precipitate from the concentrated used sulphuric acid.

The addition of these powdered alkali compounds can also occur according to one of the method steps described above for reducing the amount of sulphuric acid adhering to the separated precipitate, such as washing with a washing medium, for instance dilute acid, saturated $FeSO_4$ solution, diluted $FeSO_4$-containing aqueous solutions or water, or displacing the sulphuric acid with compressed air or washing with steam or reaction with iron or an alkaline iron (II) compound and water, in order to partially neutralise or neutralise the residual acid in the separated precipitate.

Following reduction of the amount of sulphuric acid adhering to the separated precipitate or following partial neutralisation or neutralisation of the residual acid in the separated precipitate by adding powdered alkali compounds, a defined amount of water, aqueous saline solution or diluted sulphuric acid is preferably added so that granulation can take place. This addition can occur particularly advantageously in the filer aggregate by displacement washing of the dilute acid with water, which then additionally increases the amount of acid regained without notably increasing the amount of water to be evaporated. The required amount of water can optionally also come from the addition of moist green salt. This variant has the advantage that drying of the green salt then occurs without requiring energy or chemical expenditure and a granular or powdered product is obtained.

The amount of water thereby added can be 100 to 550 mol-% based on the iron (II) sulphate monohydrate contained in the separated precipitate. In a particularly preferred embodiment, the amount of water added is 250 to 350 mol-% based on the iron (II) sulphate monohydrate contained in the separated precipitate.

Granulation and control of the granule size preferably occurs by means of mechanical formation or by blowing with air or by spraying with a nozzle or a rotary disk or by cooling, e.g. by means of a cooling roller or a cooling conveyer or by falling or swirling in cold air. Depending on the process parameters set, solid blocks, coarse or fine granules or powdered bulk materials are thereby obtained.

The iron (II) sulphate-containing reducing agent, which is obtained according to the above methods and which is industrially particularly inexpensive, energy-saving and of a constant quality, can be used to reduce chromate in cement.

The iron (II) sulphate-containing reducing agent according to the invention has an average crystallite size of less than 2 μm, preferably between 0.1 and 1.0 μm. In several particular embodiments, the average crystallite size is in the range of 0.2 and 0.5 μm.

The average crystallite size is determined as follows: the samples are measured under a Kapton foil (in order to exclude moisture) on a Philips PW 1800 diffractometer. Determination of the crystallite size occurs by means of the Philips Fit program from the 100% reflection of the measured spectrum.

For the iron (II) sulphate-containing reducing agent (iron (II) sulphate monohydrate) the 100% reflection hkl 200 at 25.879° 2 theta from the measuring range 25° to 28° 2 theta was used to determine the crystallite size.

For the reducing agent according to the prior art, i.e. green salt of the firm KRONOS (iron (II) sulphate heptahydrate) the 100% reflection hkl 111 at 18.088° 2 theta from the measuring range 17.5° to 18.75° 2 theta was used to determine the crystallite size.

The crystallite size is thereby not identical to the size of the primary particles as is recognisable from electron micrographs. However, clear differences can also be seen in the electron micrographs: the average primary particle size for the iron (II) sulphate-containing reducing agent according to the invention is approximately 5 μm; the average primary particle size of the reducing agent according to the prior art (i.e. green salt of the firm KRONOS) is approximately 50 μm.

As compared to conventionally obtained iron (II) sulphate heptahydrate (green salt), the crystallite size of these iron (II) sulphate-containing metal sulphates is clearly lower (0.3 as compared to >>3 μm in conventional green salt) and the contents of metals apart from iron is higher than in green salt.

The iron (II) sulphate-containing reducing agent according to the invention preferably contains 5 to 15% by weight, particularly preferred 7 to 13% by weight, of titanium, based on iron, and/or preferably 1.5 to 4.0% by weight, particularly preferred 2.0 to 3.5% by weight, of manganese, based on iron.

An advantage of the method according to the invention is that in addition to iron sulphate, all the metal sulphates crystallising out of the concentrated sulphuric acid, e.g. manganese (II) sulphate, can be recycled. The further metal sulphates contained in small amounts in the iron (II) sulphate-containing reducing agent according to the invention do not display any disadvantageous effects and are permanently bound in the cement matrix following hardening. Thus, for example, owing to the iron (II) sulphate-containing reducing agent according to the invention, the content of undesired soluble chromium can be effectively reduced to a sufficient extent despite the additional introduction of chromium into the cement.

When added to the cement-water mixture during the processing of cement, the effectiveness of the iron (II) sulphate-containing reducing agent according to the invention is comparable to that of conventionally used green salt (see Example 2). 0.01 to 5.0% by weight, particularly preferred 0.2 to 1.5% by weight of the iron (II) sulphate-containing reducing agent according to the invention is used. The addition of the iron (II) sulphate-containing reducing agent can thereby also take place as a solution or suspension.

When the iron (II) sulphate-containing reducing agent according to the invention is used, a lower effect as compared to the prior art can be determined for a low added amount after a short storage period (see Example 3: addition of 0.3% by weight or 0.6% by weight). However, the iron (II) sulphate-containing reducing agent according to the invention surprisingly does not display the generally known continuously decreasing reducing effect as the storage time increases, but rather a reducing effect that increases again. As compared to the reducing agents of the prior art, the reducing agent according to the invention therefore does not demonstrate a significant decrease in the reducing effect as the storage time increases, in particular not after 1 month.

Mixtures of the iron (II) sulphate-containing reducing agent with other reducing agents, for example with conventional green salt, can also be advantageous. A mixture with moist green salt can be particularly favourable.

It is furthermore possible to mix the iron (II) sulphate-containing reducing agent or a mixture of the iron (II) sulphate-containing reducing agent with green salt with further inert inorganic and/or organic compounds so as to set favourable transportation and/or storage properties in a targeted manner.

The iron (II) sulphate-containing reducing agent according to the invention can be mixed either with the ground cement during filling in silos or bags,
with the ground cement directly after milling and before feeding to the silo,
directly before loading in the silo lorry
or first just before, during or after preparation of the cement with water.

The invention also provides a preparation comprising a mixture of cement and the reducing agent according to the invention, the preparation containing 0.01 to 5.0% by weight, particularly preferred 0.2 to 1.5% by weight, of the iron (II) sulphate-containing reducing agent.

A further preparation according to the invention contains cement, water and the iron (II) sulphate-containing reducing agent according to the invention, the preparation containing 0.01 to 5.0% by weight, preferably 0.2 to 1.5% by weight, of the iron (II) sulphate-containing reducing agent, based on the cement.

EXAMPLES

Example 1

Production and characterisation of the iron (II) sulphate-containing reducing agent The dilute acid obtained during production of titanium dioxide according to the sulphate process, which has a sulphuric acid content of 23.5% and an iron content of 3.8%, was concentrated by evaporation in a three-stage forced-circulation evaporation system with a gradually increasing vacuum until a sulphuric acid content of 48% was achieved (which corresponds to a sulphuric acid concentration in the liquid phase of 70%). A large part of the iron sulphate crystallises out as monohydrate during concentration by evaporation. Following concentration by evaporation, the obtained slurry was subjected to ripening, whereby its temperature was reduced from approximately 90° C. to 60° C. in a stirring cascade. The slurry was then filtered under pressure in a candle filter system and the filter cake was partially freed from adhering sulphuric acid using compressed air. A crumbly, dry, easy-to-handle filter cake (filter salt) is obtained, which can be used as an iron (II) sulphate-containing reducing agent.

The crystallite size was determined by means of radiography. The crystallite size of conventional green salt (KRONOS) is >>3 μm (determination of the crystallite size for green salt cannot be clearly ascertained using this technology; however, it is in any case far greater than 3 μm).

TABLE 1

|  | iron (II) sulphate-containing reducing agent (unwashed)/% |
| --- | --- |
| Fe (II) | 15.05 |
| Fe (total) | 15.5 |
| Al | 0.28 |
| Ca | 0.056 |
| Cr | 0.048 |
| Mg | 1.5 |
| Mn | 0.37 |
| Na | 0.22 |
| Nb | <0.005 |
| Ti | 1.4 |
| V | 0.13 |
| Free $H_2SO_4$ | 24.75 |
| Crystallite size | 0.33 μm |

Example 2a)

In each case, a slurry was formed by mixing 200 g of filter salt having a free sulphuric acid content of 25.3% with hot dilute acid at 60° C. on a pre-heated suction filter, and the hot suspension was sharply sucked off. Contrary to washing with cold, diluted sulphuric acid, a non-thixotropic, free-flowing filter salt was obtained in all cases.

TABLE 2

| Test number | Added amount of dilute acid [g] | $H_2SO_4$ in the filter cake [%] | Thixotrophy |
| --- | --- | --- | --- |
| Filter salt before washing | — | 25.3 | No |
| 1 | 100 | 20.7 | No |
| 2 | 200 | 12.9 | No |
| 3 | 300 | 11.3 | No |

Example 2b)

Washing was carried out in the same manner as in Example 2 a), test 3. Neutralisation of the residual acid in the filter salt then occurred by mixing in 10% by weight of $CaCO_3$.

Example 3a)

The dilute acid obtained during production of titanium dioxide according to the sulphate process, which has a sulphuric acid content of 23.5% and an iron content of 3.8%, was concentrated by evaporation in a three-stage forced-circulation evaporation system with a gradually increasing vacuum until a sulphuric acid content of 48% was achieved (which corresponds to a sulphuric acid concentration in the liquid phase of 70%). A large part of the iron sulphate crystallises out as monohydrate during concentration by evaporation. Following concentration by evaporation, the obtained slurry was subjected to ripening, whereby its temperature was reduced from approximately 90° C. to 60° C. in a stirring cascade. Following filtration of the slurry using a filter press, 2 kg of filter salt having a free sulphuric acid content of 23% were obtained. Directly after the filtration process, without emptying the press, washing is carried out with 60° C. hot water with three times the chamber volume of the press, pressing takes place again and then blow drying occurs. A free-flowing iron (II) sulphate-containing reducing agent having a pH value of 1.8 was obtained.

A material having a pH value of 2.2 is obtained by adding 6% by weight of powdered $Ca(OH)_2$.

The iron (II) sulphate-containing reducing agent obtained has good rheological properties and is not a hazardous substance owing to its pH of value >2.

Determination of the pH value is carried out in the eluate of 10 g of salt in 1000 g of $H_2O$ by means of a pH single rod measuring element with an Ag/AgCl reference system of the firm Schott, type H6580, on a pH meter of the firm Knick, type 765 Calimatic.

Example 3b)

The filter salt having a free sulphuric acid content of 23%, which was obtained in Example 3a) following filtration of the slurry using a filter press, was then immediately blown dry with compressed air without emptying the filter press, was pressed out, and then blown dry again.

A free-flowing iron (II) sulphate-containing reducing agent having a pH value of 1.5 is obtained.

A material having a pH value of 2.6 is obtained by adding 15% by weight of powdered $Ca(OH)_2$.

The iron (II) sulphate-containing reducing agent obtained has good rheological properties and is not a hazardous substance owing to its pH value of >2.

The pH value is determined in the same manner as in Example 3 a).

Example 4

Washing was carried out in the same manner as in Example 2. Part of the washed filter salt obtained according to Example 2, test 3, was mixed with two parts iron (II) sulphate heptahydrate and kept moving for several hours. A powder having no thixotropic properties is obtained. Mixing in the ratio described above can alternatively be carried out at 80° C. A viscous melt is obtained, which solidifies during cooling to form a hard cake.

Example 5

500 g of filter salt having a free sulphuric acid content of 25.3% were pre-heated in a pressure suction filter that can be heated using steam, and superheated steam was guided through the filter cake at a slight overpressure until the amount of sulphuric acid condensate became clearly lower.

TABLE 3

| Test temperature (° C.) (Filter salt and steam) | $H_2SO_4$ in the filter cake (% w/w) | $H_2SO_4$ in the condensate of steam washing (% w/w) | $FeSO_4$ in the condensate of steam washing (% w/w) |
|---|---|---|---|
| Filter salt before washing | 25.3 | — | — |
| 105 | 2.2 | 24.8 | 12.1 |
| 110 | 3.5 | 34.1 | 7.2 |
| 120 | 4.6 | 47.6 | 4.1 |

Example 6

Washing was carried out at 120° C. in the same manner as in Example 5. Neutralisation of the residual acid in the filter cake then occurred by adding 5% by weight of $CaCO_3$.

Example 7

In each case, 30 g of filter salt having an iron content of 16.2% and a free sulphuric acid content of 20.3% were impasted with 7.5 g of water at temperatures of greater than 60° C. and reacted with different amounts of metallic iron. Both iron powder having an average particle size of 10 μm and iron granules having a particle size of 1 to 2 mm were thereby used. As the particle size increased, so did the time required until the iron had completely dissolved.

Table 4 shows an overview.

TABLE 4

| Filter salt (g) | Fe (met) (g) | Water (g) | Reaction time (min) | Reaction temp. (° C.) | Product (g) | % Fe in Prod. | | % $H_2SO_4$ | |
|---|---|---|---|---|---|---|---|---|---|
| | | | | | | Analysis | Theor. | Analysis | Theor. |
| Raw material | | | | | | 16.20 | | 20.30 | |
| 30 | 3 (*1 | 7.5 | 15 | 70 (*3 | 38.9 | 20.24 | 20.21 | 2.33 | 2.11 |
| 30 | 3 (*1 | 7.5 | 15 | 80 | 38.6 | 20.39 | 20.36 | 2.18 | 2.13 |
| 30 | 2.5 (*1 | 7.5 | 15 | 80 | 39.5 | 19.05 | 18.63 | 4.09 | 4.30 |
| 30 | 2 (*1 | 7.5 | 15 | 80 | 38.8 | 17.65 | 17.68 | 6.43 | 6.64 |
| 30 | 3 (*2 | 7.5 | 360 | 80 | 38.5 | not determined | 20.58 | not determined | 2.15 |

(*1 iron powder, reinst. (particle size: 10 μm of the firm Merck)
(*2 iron granules, techn. (particle size: approximately 1 to 2 mm)
(*3 after 15 mins even smaller amounts of iron powder were recognisable Example 8

The reaction was carried out in the same manner as in Example 7. A product having a residual acid content of 4.09% was pulverised and the residual acid in the filter salt was neutralised by adding 5% by weight of $CaCO_3$. The aqueous extract of the powder obtained in this manner does not demonstrate any acidic properties.

Example 9

Addition of the iron (II) sulphate-containing reducing agent produced according to Example 1 to cement upon mixing with water.

Mixing of the cement with water took place in accordance with the methods for sample preparation described in TRGS 613 (Technical Rules for Hazardous Substances). Following mixing of the water and cement, the iron (II) sulphate-containing reducing agent was added and then stirred for 15 minutes.

Deviating from TRGS 613, five times the amount (however the same ratio of cement to water) was eluted in order to determine the soluble chromium, and the dissolved chromium was determined by means of ICP-OES.

It can be seen that if an amount of 0.10% by weight or more of the iron (II) sulphate-containing reducing agent is added, the content of soluble chromium is below the detection limit.

amount (however the same ratio of cement to water) was eluted and the dissolved chromium was determined by means of ICP-OES.

TABLE 7

| Reducing agent | Amount/ % by wt | FeSO$_4$/ % by wt (calculated) | Cr in the eluate/mg/l | | | |
|---|---|---|---|---|---|---|
| | | | 1 day storage | 1 week storage | 2 weeks storage | 4 weeks storage |
| No additive | 0 | 0 | 1.5[a] | 1.5[a] | 1.5[a] | 1.5[a] |
| iron (II) sulphate-containing reducing agent | 0.30 | 0.126 | 0.64 | 1.64 | 0.66 | 0.62 |
| iron (II) sulphate-containing reducing agent | 0.60 | 0.252 | 0.28 | 0.23 | 0.2 | <0.1 |
| iron (II) sulphate-containing reducing agent | 0.90 | 0.378 | <0.1 | <0.1 | <0.1 | <0.1 |
| iron (II) sulphate-containing reducing agent | 1.50 | 0.630 | <0.1 | <0.1 | <0.1 | <0.1 |
| As a comparison: green salt (KRONOS) | 0.30 | 0.130 | <0.1 | <0.1 | <0.1 | <0.1 |

[a]value is not dependent on time

TABLE 5

| Additive reducing agent/ % by wt | FeSO$_4$/ % by wt (calculated) | Cr in eluate/ mg/l | Cr soluble/ ppm |
|---|---|---|---|
| 0 | 0 | 1.5 | 6 |
| 0.05 | 0.021 | 0.69 | 2.76 |
| 0.10 | 0.042 | <0.1 | <0.4 |
| 0.30 | 0.126 | <0.1 | <0.4 |
| 0.50 | 0.210 | <0.1 | <0.4 |
| 1.00 | 0.420 | <0.1 | <0.4 |

As a comparison, the test was carried out with conventional green salt (=iron (II) sulphate heptahydrate of the firm KRONOS):

TABLE 6

| Additive green salt/ % by wt | FeSO$_4$/% by wt (calculated) | Cr in eluate/ mg/l | Cr soluble/ ppm |
|---|---|---|---|
| 0 | 0 | 1.5 | 6 |
| 0.05 | 0.022 | 0.19 | 0.76 |
| 0.10 | 0.043 | 0.1 | 0.4 |
| 0.30 | 0.130 | <0.1 | <0.4 |
| 0.50 | 0.217 | <0.1 | <0.4 |
| 1.00 | 0.434 | <0.1 | <0.4 |

It can be seen that if an amount of conventional green salt of 0.10% by weight or more is added, the content of soluble chromium is at or below the detection limit.

Example 10

Addition of the iron (II) sulphate-containing reducing agent produced according to Example 1 to cement upon mixing with water Different amounts (see table 7) of iron (II) sulphate-containing reducing agent were added to ground cement as an additive and were mixed for 1 hour in an eccentric tumbler. The cement samples charged with the iron (II) sulphate-containing reducing agent were then stored for different lengths of time at room temperature in vessels sealed in an airtight manner. The test for the reducing effect was carried out in accordance with TRGS 613 by mixing the cement with water. However, deviating from TRGS 613, five times the The limiting value of 0.5 mg/l of chromium in the eluate is not exceeded when 0.30% by weight of conventional green salt (KRONOS) is added or when 0.60% by weight or more of the iron (II) sulphate-containing reducing agent is added. It can furthermore be seen that when 0.60% by weight of the iron (II) sulphate-containing reducing agent is added, the content of soluble chromium is below the detection limit after a storage period of 4 weeks, even though higher contents had been detected in the meantime.

Example 11

A sample of the iron (II) sulphate-containing reducing agent (filter salt) produced according to Example 1 was mixed with 10% by weight of $CaCO_3$.

Determination of the effectiveness as regards chromate reduction in cement:

In order determine the effectiveness of the iron (II) sulphate-containing reducing agent obtained in this manner, 0.3, 0.5, 0.7 and 1.0 M-% of the iron (II) sulphate-containing reducing agent were first of all added to a test cement having a water-soluble chromate content of 14.31 μg Cr(VI)/g cement [=14.31 ppm Cr(VI)]. The chromium content thereof was then determined in accordance with the analysis instructions in the appendix of TRGS 613. The reduction success was only low at a dose of 0.3% of iron (II) sulphate-containing reducing agent (the average amount added for the addition of Fe (II) sulphate preparations in German cements). The content of water-soluble chromate was only below the limiting value of 2 ppm cited in the TRGS 613 at a dose of 0.7%. When a dose of 1.0% of iron (II) sulphate-containing reducing agent was added to the test cement, the content of water-soluble chromate was below the detection limit.

Determination of the standard cement compressive strength according to DIN EN 196-1:

Determination of the standard cement compressive strength was carried out using 4 cm×4 cm×16 cm standard mortar prisms in accordance with DIN EN 196-1 aged 1, 2, 7 and 28 days (six measurements were carried out per test age). 1.0% of the iron (II) sulphate-containing reducing agent was added to the test cement described above. The test cement without iron (II) sulphate-containing reducing agent thereby served as a reference. The results of the normal compressive strength test concur to a great extent for both cements (with and without iron (II) sulphate-containing reducing agent).

Determination of solidification times according to DIN EN 196-3:

In order to determine the start of solidification, the test cement described above was again used with and without iron (II) sulphate-containing reducing agent. The times for the start of solidification and the end of solidification were each reduced by a third owing to the addition of 1.0% of iron (II) sulphate-containing reducing agent. The reason for this is the significant increase of the sulphate content in the cement that is already optimised for sulphate carriers.

Determination of the water demand according DIN EN 196-3:

The cements described above both with and without iron (II) sulphate-containing reducing agent have the same water demand for obtaining the normal mortar stiffness according to DIN EN 196-3.

The technically relevant properties of normal compressive strength and water requirement of the test cement used are also not affected at the very high dose of iron (II) sulphate-containing reducing agent of 1.0%, which is required for sufficient chromate reduction. The solidification times of the test cement are, however, each reduced by a third owing to the iron (II) sulphate-containing reducing agent. This quicker solidification is due to the increased charge of sulphate owing to the high dose of the iron (II) sulphate-containing reducing agent.

Example 12

As in Example 11, 10% by weight of $CaCO_3$ was added to the filter salt. The partially neutralised filter salt was mixed with green salt in a ratio of 1:1 and 2:1, and 0.5 and 0.7% of these mixtures were added to a test cement as described in Example 11.

The obtained mixture displays good rheological properties. The content of water-soluble chromate was below the limiting value of 2 ppm as specified in TRGS 613 for both doses (0.5% and 0.7%)

The invention claimed is:

1. A method of reducing soluble chromate content in cement comprising mixing the cement with an iron (II) sulphate monohydrate-containing reducing agent comprising an iron (II) sulphate monohydrate-containing precipitate, which is produced by concentrating an iron (II) sulphate monohydrate-containing used sulphuric acid and separating the sulphuric acid from the obtained precipitate, and the precipitate having a titanium content of 5 to 15% by weight, based on iron.

2. The method of claim 1, characterised in that 0.01 to 5.0% by weight of the iron (II) sulphate monohydrate-containing precipitate is added to the cement.

3. The method of claim 1, characterised in that the iron (II) sulphate monohydrate-containing reducing agent is added to the powdered cement after milling and before or during filling in packages or bulk containers or transport containers.

4. The method of claim 3, characterised in that after mixing with the powdered cement, the reducing effect of the iron (II) sulphate monohydrate-containing reducing agent increases at least temporarily as the storage time increases.

5. The method of claim 1, wherein the precipitate has an average crystallite size of less than 2 μm.

6. The method of claim 1, wherein the precipitate has an average crystallite size of between 0.1 and 1.0 μm.

7. The method of claim 1, wherein the iron (II) sulphate-containing used sulphuric acid is obtained from the production of titanium dioxide according to the sulphate process.

8. The method of claim 1, wherein the iron (II) sulphate-containing used sulphuric acid is obtained from a metal pickling process.

9. The method of claim 1, characterised in that when producing the iron (II) sulphate-containing precipitate, following separation of the sulphuric acid, reduction of the amount of sulphuric acid adhering to the separated precipitate takes place by means of further separation, partial neutralisation or neutralisation.

10. The method of claim 9, characterised in that reduction of the amount of sulphuric acid adhering to the separated precipitate takes place by washing with water, dilute acid, saturated $FeSO_4$ solution or diluted $FeSO_4$-containing aqueous solutions.

11. The method of claim 9, characterised in that reduction of the amount of sulphuric acid adhering to the separated precipitate takes place by displacement with compressed air or by washing with steam.

12. The method of claim 9, characterised in that reduction of the amount of sulphuric acid adhering to the separated precipitate takes place by reacting the separated precipitate with water and metallic iron or an alkaline iron (II) compound at a temperature of greater than 60° C.

13. The method of claim 9, characterised in that reduction of the amount of sulphuric acid adhering to the separated precipitate takes place by means of partial neutralisation or neutralisation by adding powdered alkali compounds, selected from the group consisting of $CaCO_3$, CaO, $Ca(OH)_2$, MgO and/or $Mg(OH)_2$ or elutriations thereof.

14. The method of claim 9, characterised in that following reduction of the amount of sulphuric acid adhering to the separated precipitate or following partial neutralisation or neutralisation of the residual acid in the separated precipitate, a defined amount of water, an aqueous saline solution or a diluted sulphuric acid is added, and granulation takes place.

* * * * *